(No Model.)

H. E. KELLEY.
ANIMAL TRAP.

No. 409,467.   Patented Aug. 20, 1889.

Witnesses
C. L. Bendixon
J. J. Laass

Inventor
Harry E. Kelley
By his Attorneys
Hull, Laass & Hull

UNITED STATES PATENT OFFICE.

HARRY E. KELLEY, OF NIAGARA FALLS, ASSIGNOR TO THE ONEIDA COMMUNITY, (LIMITED,) OF COMMUNITY, NEW YORK.

ANIMAL-TRAP.

SPECIFICATION forming part of Letters Patent No. 409,467, dated August 20, 1889.

Application filed January 11, 1889. Serial No. 296,083. (No model.)

*To all whom it may concern:*

Be it known that I, HARRY E. KELLEY, of Niagara Falls, in the county of Niagara, in the State of New York, have invented new and useful Improvements in Animal-Traps, of which the following, taken in connection with the accompanying drawings, is a full, clear, and exact description.

This invention relates to the class of animal-traps in which spring-actuated jaws are retained in their set position by a latch or catch sustaining simultaneously the bait-pan in its set position. Said latches or catches have been formed in various ways, and in the majority of cases they pass across the top of the jaw and fly upward and outward from the trap when sprung, and such a movement of the latch is liable to throw the animal's foot out of the trap, while in other cases the latches or catches are liable to be stepped on by the animal and the pressure upon the said latches or catches prevents the trap from being sprung. All of these defects are effectually obviated in this invention, which consists, essentially, in the employment of a dog which slides on the frame and is adapted to sustain the bait-pan and one of the jaws simultaneously in their set positions; and the invention also consists in certain peculiarities of the details of said sliding dog, as hereinafter fully explained, and specifically set forth in the claims.

Figure 1:
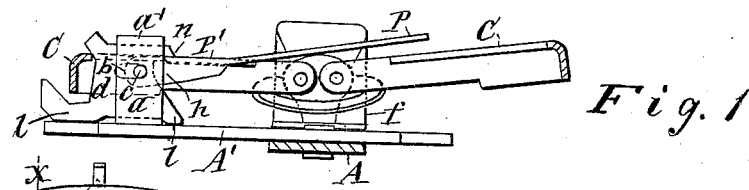
Figure 2:
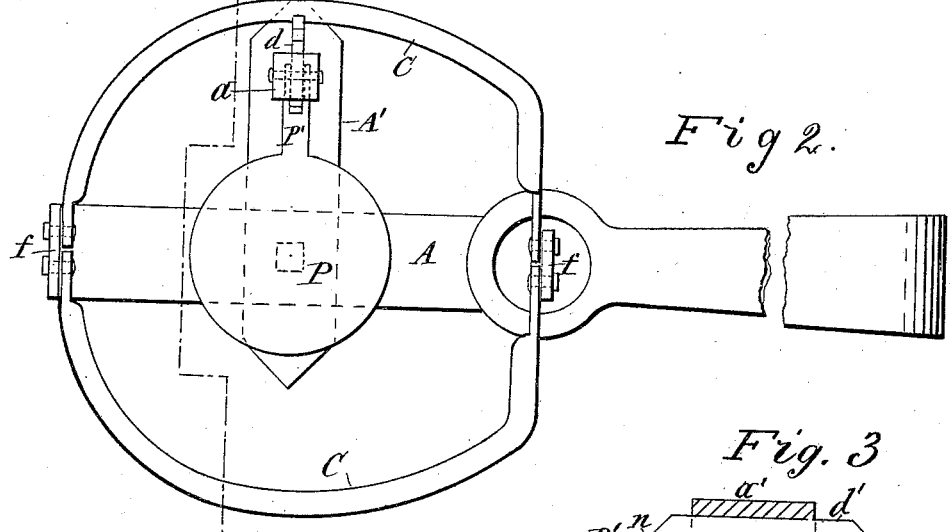
Figure 3:
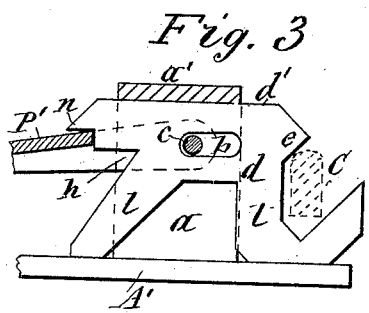
Figure 4:
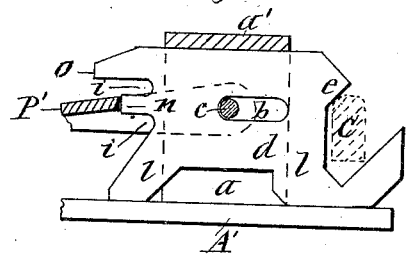
Figure 5:
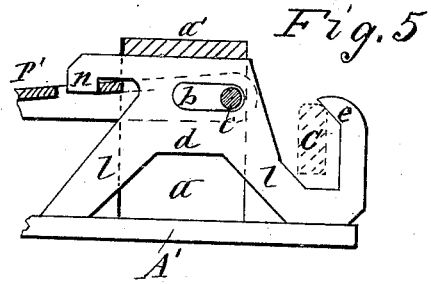

In the annexed drawings, Figure 1 is a transverse section on line $x\,x$, Fig. 2. Fig. 2 is a plan view of the trap in its set position; and Figs. 3, 4, and 5 are sectional views illustrating various modifications of my invention.

Similar letters of reference indicate corresponding parts.

A and A' represent two plates secured at right angles to each other and constituting the main supporting-frame of the trap, the plate A being provided at opposite ends with posts $f f$, to which the jaws C C are hinged in the usual and well-known manner. On the free end of the plate A' is a rigid duplex post $a$, which is preferably formed with a cap $a'$, for the purpose hereinafter explained.

P denotes the bait-pan, and $d$ its sustaining catch or dog, both of which I connect in common to the post $a$. The shank P' of the bait-pan is bifurcated and provided with perforated ears $h$, which are inserted into the post, and a pin $c$ passes transversely through the post and through the ears $h$, and thus hinges the bait-pan to the post. The dog $d$ is arranged to slide longitudinally in the post and toward and from the bait-pan, and is provided with a longitudinal slot $b$, through which the pin $c$ passes. I form this dog by stamping it out of sheet metal, which is easily done, inasmuch as said dog consists of a straight plate formed with legs $l\,l$, by which it rides on the plate A, and with a straight longitudinal top bearing $d'$, by which it slides on the under side of the cap $a'$, and is thus properly sustained in its operative position. This sliding dog is adapted to sustain the bait-pan P and one of the jaws C simultaneously in their set positions, and its form is susceptible of many modifications. Each of said dogs is formed at one end with a nose $n$, by which it is adapted to engage the heel or hinged end of the bait-pan, and the opposite end of the dog is formed with an inclined or sloping tail-piece $e$, which affords to the dog a wedging hold on the jaw C, so as to cause the dog to be crowded longitudinally either inward or outward, according to the disposition of inclination of said tail-piece.

In Figs. 3 and 4 the tail-piece $e$ is disposed at such an angle of inclination as to cause the jaw C to crowd the dog inward, and in this case the shank P' of the bait-pan bears on the end of the nose $n$, as indicated by dotted lines. A depression of the bait-pan releases it from the nose $n$, and the dog is thus allowed to be crowded inward by the pressure of the jaw C on the tail-piece $e$, and the said jaw is thereby liberated and allowed to spring into its closed position.

The dog shown in Fig. 4 of the drawings is formed with recesses $i\,i$ above and below the nose $n$, and thus allows the trap to be sprung by either an upward or a downward movement of the bait-pan, and in order to prevent the bait from flying upward too far and throwing the animal's foot out of the trap I form the said dog with a projecting guard $o$, with which the bait-pan collides. The dog shown in Fig. 5 of the drawings has the tail-piece $e$ inclined in such a direction as to cause the jaw C to crowd the dog outward, and therefore I form the nose $n$ in the shape of a hook, which enters an orifice in the top of the shank P' of the bait-pan.

I do not limit myself to the arrangement of the post $a$ and sliding dog $d$ on the plate A', inasmuch as the said plate may be dispensed with, and the plate A may be made of sufficient width to allow the aforesaid post and dog to be mounted thereon.

Having described my invention, what I claim as new, and desire to secure by Letters Patent, is—

1. In combination with the frame, bait-pan, and jaws of an animal-trap, a sliding dog secured intermediate of its length to the frame and having one end provided with catches engaging the bait-pan, and the opposite end of said dog provided with wedging-bearings engaging one of the jaws, substantially as set forth.

2. In combination with the frame, bait-pan, and jaws of an animal-trap, a duplex post on the frame, a dog sliding in said post and adapted to engage at opposite ends simultaneously the bait-pan and one of the jaws, and provided with a longitudinal slot, and a pin passing through the post and aforesaid slot, substantially as described and shown.

3. In combination with the frame, bait-pan, and jaws, the duplex post $a$, formed with the cap $a'$, the dog $d$, stamped out of sheet metal and sliding in the aforesaid post and formed with the horizontal top bearing $d'$, legs $l\ l$, longitudinal slot $b$, nose $n$ at one end and wedging tail-piece $e$ at the opposite end, and the pin $c$, passing transversely through the post and slot $b$, substantially as described and shown.

4. In combination with the frame, bait-pan, and jaws, the sliding dog $d$, formed at one end with a wedging catch engaging one of the jaws and at the opposite end with the nose $n$ and guard $o$ above said nose, substantially as and for the purpose set forth.

5. In combination with the duplex post $a$, the bait-pan and its sustaining catch or dog connected in common to said post, as set forth.

6. In combination with the duplex post $a$, the sliding dog $d$, provided with the slot $b$, the bait-pan P, provided with perforated ears, and the pin $c$, passing transversely through the post and through the ears of the bait-pan and slot of the aforesaid dog, substantially as described and shown.

In testimony whereof I have hereunto signed my name, in the presence of two witnesses, at Niagara Falls, in the county of Niagara, in the State of New York, this 3d day of January, 1889.

HARRY E. KELLEY. [L. S.]

Witnesses:
C. F. GEYER,
S. J. DEVLIN.